(12) United States Patent
Hernandez

(10) Patent No.: US 9,127,897 B2
(45) Date of Patent: Sep. 8, 2015

(54) SUBMERSED HEAT EXCHANGER

(75) Inventor: Robert Hernandez, Meadows Place, TX (US)

(73) Assignee: KELLOGG BROWN & ROOT LLC, Houston, TX (US)

( * ) Notice: Subject to any disclaimer, the term of this patent is extended or adjusted under 35 U.S.C. 154(b) by 1145 days.

(21) Appl. No.: 12/981,824

(22) Filed: Dec. 30, 2010

(65) Prior Publication Data

US 2012/0168142 A1 Jul. 5, 2012

(51) Int. Cl.
| | | |
|---|---|---|
| *F28F 27/00* | (2006.01) | |
| *E21B 36/00* | (2006.01) | |
| *F28D 1/02* | (2006.01) | |
| *F28D 1/047* | (2006.01) | |
| *F28F 13/08* | (2006.01) | |
| *E21B 43/01* | (2006.01) | |
| *F28D 21/00* | (2006.01) | |

(52) U.S. Cl.
CPC ............. *F28F 27/00* (2013.01); *E21B 36/001* (2013.01); *E21B 43/01* (2013.01); *F28D 1/022* (2013.01); *F28D 1/0477* (2013.01); *F28F 13/08* (2013.01); *F28D 2021/0059* (2013.01)

(58) Field of Classification Search
CPC .......... F04C 28/26; F04B 49/24; F28F 13/08; E21B 36/001
USPC .............. 165/279, 292, 45, 47, 48.1, 72, 128, 165/129, 132, 142, 163; 417/307, 292, 308, 417/279; 62/196.3, 118, 505; 166/335; 251/345

See application file for complete search history.

(56) References Cited

U.S. PATENT DOCUMENTS

| | | | | | |
|---|---|---|---|---|---|
| 1,735,498 | A | * | 11/1929 | Etienne | 62/213 |
| 2,062,054 | A | * | 11/1936 | Huggins | 62/335 |
| 2,082,549 | A | * | 6/1937 | Philipp | 62/198 |
| 3,384,169 | A | * | 5/1968 | Leonard | 166/357 |
| 3,744,935 | A | * | 7/1973 | Magni | 417/370 |
| 4,025,239 | A | * | 5/1977 | Richardson et al. | 417/292 |
| 4,248,055 | A | * | 2/1981 | Day et al. | 62/196.3 |
| 4,366,106 | A | * | 12/1982 | Benyak et al. | 261/156 |
| 4,603,559 | A | * | 8/1986 | Wu | 62/434 |
| 4,676,071 | A | * | 6/1987 | Latimer | 62/115 |
| 5,018,665 | A | * | 5/1991 | Sulmone | 236/93 A |
| 5,139,393 | A | * | 8/1992 | Sulmone | 417/292 |
| 5,167,491 | A | * | 12/1992 | Keller et al. | 417/28 |
| 5,248,244 | A | * | 9/1993 | Ho et al. | 417/292 |
| 5,277,028 | A | * | 1/1994 | Worner et al. | 60/468 |
| 5,316,448 | A | * | 5/1994 | Ziegler et al. | 417/307 |

(Continued)

FOREIGN PATENT DOCUMENTS

| | | |
|---|---|---|
| WO | WO 2008004886 | 1/2008 |
| WO | WO 2010002272 | 1/2010 |

*Primary Examiner* — Alexander Comley
(74) *Attorney, Agent, or Firm* — Gary M. Machetta

(57) ABSTRACT

Systems and methods for transporting a hydrocarbon are provided. The method can include introducing a fluid at a first pressure and a first temperature to an inlet of a pump and pressurizing the fluid within the pump to produce a pressurized fluid having a second pressure and a second temperature. The method can also include flowing at least a portion of the pressurized fluid through a first heat exchanger and back to the inlet of the pump. The heat exchanger can include a coil having an inlet and an outlet and a housing at least partially enclosing the coil and having a first opening and a second opening. A first end of the coil can be disposed proximate the first opening. The heat exchanger can also include a foundation for supporting the coil and the housing.

9 Claims, 4 Drawing Sheets

(56) References Cited

U.S. PATENT DOCUMENTS

| | | | |
|---|---|---|---|
| 5,397,220 A * | 3/1995 | Akihisa et al. | 417/369 |
| 5,509,272 A * | 4/1996 | Hyde | 62/176.5 |
| 5,573,060 A * | 11/1996 | Adderley et al. | 165/166 |
| 5,803,161 A | 9/1998 | Wahle et al. | |
| 5,832,739 A * | 11/1998 | Bacchus | 62/310 |
| 6,279,658 B1 | 8/2001 | Donovan | |
| 6,302,191 B1 | 10/2001 | Wickham et al. | |
| 6,427,464 B1 * | 8/2002 | Beaverson et al. | 62/196.3 |
| 6,595,011 B1 * | 7/2003 | Forgy | 62/91 |
| 7,377,039 B2 * | 5/2008 | Al-Anizi et al. | 29/890.043 |
| 7,530,398 B2 | 5/2009 | Balkanyi et al. | |
| 7,845,411 B2 | 12/2010 | Vinegar et al. | |
| 2003/0011289 A1 | 1/2003 | Adams et al. | |
| 2005/0207909 A1 * | 9/2005 | Bean et al. | 417/297 |
| 2009/0031448 A1 | 1/2009 | Simmons et al. | |
| 2009/0185867 A1 | 7/2009 | Masters et al. | |
| 2009/0277612 A1 | 11/2009 | Poorte et al. | |
| 2010/0006291 A1 | 1/2010 | Poorte et al. | |
| 2010/0252227 A1 * | 10/2010 | Sten-Halvorsen et al. | 165/45 |

* cited by examiner

SUBMERSED HEAT EXCHANGER

BACKGROUND

1. Field

Embodiments described herein generally relate to processing a hydrocarbon. More particularly, such embodiments relate to subsea hydrocarbon production.

2. Description of the Related Art

Low flow rate conditions can occur in subsea hydrocarbon production requiring artificial lift techniques to bring the hydrocarbons to the surface, both in new production, referred to as "green fields," and during reservoir maintenance, referred to as "brown fields." Manifolds and flow lines used in these production techniques have a maximum design temperature, and pumps used to create artificial lift can have a limited range of flow rate capacity. Often pumps placed at or near production zones are designed in view of maximum flow rates and can only be turned down to about 80% of their maximum efficiency. Recirculation loops around pumps can be used to increase the operational envelope of the pump and can lower the acceptable minimum flow rate from a field or well. If the pressurized hydrocarbon is recycled using a recirculation loop, however, temperature in the system can increase exponentially, and quickly surpass the maximum design temperature of the flow lines, manifolds, and/or pump.

To counteract such temperature increase, seawater, in subsea hydrocarbon production, can be used as a coolant. The pipe, for example, can be arranged with one or more bends to increase the contact area between the pipe and the seawater. This approach is dependent on the water temperature and native currents in the seawater.

There is a need, therefore, for new apparatus and methods for controlling the temperature of a pumped and/or boosted fluid.

DETAILED DESCRIPTION

Systems and methods for transporting a hydrocarbon are provided. The method can include introducing a fluid at a first pressure and a first temperature to an inlet of a pump and pressurizing the fluid within the pump to produce a pressurized fluid having a second pressure and a second temperature. The method can also include flowing at least a portion of the pressurized fluid through a first heat exchanger and back to the inlet of the pump. The heat exchanger can include a coil having an inlet and an outlet and a housing at least partially enclosing the coil and having a first opening and a second opening. A first end of the coil can be disposed proximate the first opening. The heat exchanger can also include a foundation for supporting the coil and the housing.

Figure 1:
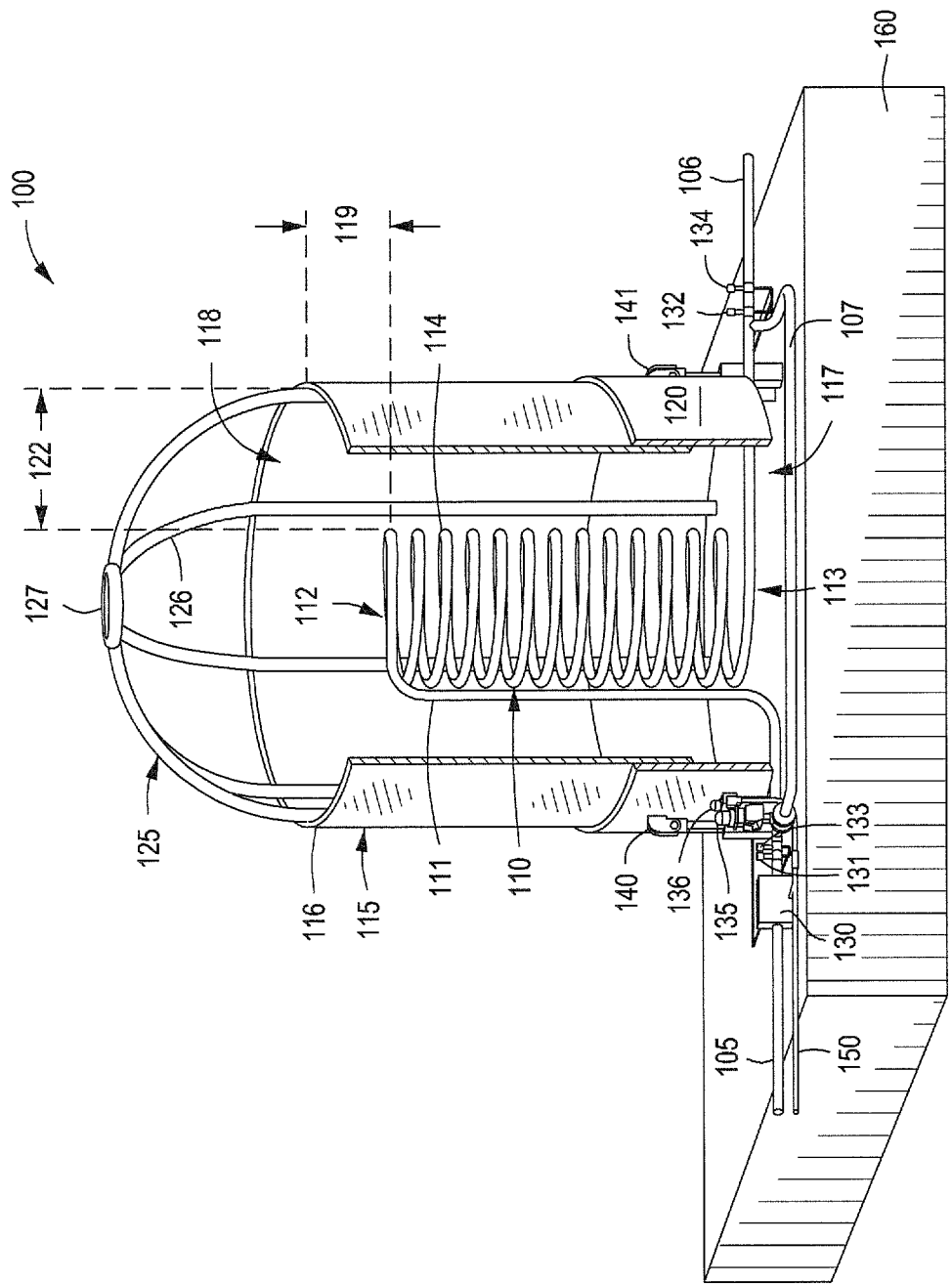
FIG. 1 depicts a perspective sectional view of an illustrative heat exchanger, according to one or more embodiments described.

FIG. 1 depicts a perspective sectional view of an illustrative heat exchanger 100, according to one or more embodiments. The heat exchanger 100 can include one or more coils 110, housings 115, and foundations or bases 160. The coil 110 can have an inlet 105 for receiving fluid, e.g., a hydrocarbon, and can have an outlet 106 for transmitting the fluid, e.g., a cooled or heated hydrocarbon. The coil 110 can have a first or "bottom" end 113 and a second or "top" end 112. The coil 110 can include one or more conduits 114. The inlet 105 can be in fluid communication with the second end 112 of the coil 110 and the outlet 106 can be in fluid communication with the first end 113 of the coil 110. A flow valve 136 can be disposed on the inlet 105 to adjust a flow of the fluid through the coil 110.

As used herein, the terms "up" and "down;" "upward" and "downward;" "upper" and "lower;" "upwardly" and "downwardly;" "above" and "below;" and other like terms refer to relative positions to one another and are not intended to denote a particular spatial orientation since the apparatus and methods of using the same can be equally effective at various angles or orientations.

The conduits 114 of the coil 110 can have a variety of shapes and sizes. For example, the cross sectional shape of the conduits 114 can be, but is not limited to, circular, elliptical, oval, triangular, rectangular, square, polygonal, some other geometric shape, or any combination thereof. The conduits 114 can be formed in a straight line, in a loop or series of loops, in a series of bends, along a serpentine or "zigzag" path, or any combination thereof. For example, the coil 110 can have a substantially straight inlet conduit 111, as shown, that can connect the inlet 105 to the second end 112 of the coil 110, and the one or more conduits 114 can be formed in a helical or coiled arrangement from the second end 112 to the first end 113 of the coil 110. The conduits 114 can include features to improve heat transfer effectiveness of the coil 110, including, but not limited to, increased surface area (e.g., fins and/or flattened pipes), material with a high heat transfer coefficient, thinner tube walls, or any combination thereof.

The inlet conduit 111 can connect the inlet 105 to the second end 112, i.e., the "top" of the coil 110. Connecting the inlet conduit 111 to the second end 112 of the coil can reduce or minimize a change in temperature from the inlet 105 to the external environment and can produce a counter current flow of a fluid flowing through the coil 110 with respect to a convection current flowing outside the coil 110. A smaller change in temperature can reduce or minimize scaling on the coil 110. Although not shown, the inlet conduit 111 can connect the inlet 105 to the side or bottom of the coil 110 to provide parallel flow heat exchange. When the heat exchanger 100 operates to cool a fluid flowing through the coil 110, the fluid introduced to the second end 112 of the coil 110 can be at a greater temperature than the fluid within the coil 110 at the first end 113.

The coil 110 can be designed to operate in subsea conditions. For example, the coil 110 can include a brass plating, e.g., navy brass, and/or can be at least partially covered or coated with one or more anti-fouling agents to help prevent damage to the coil 110 caused by scaling, mineral deposits, and/or marine growth. The coil 110 can be composed, in whole or in part, of one or more metals, metal alloys, or any combination thereof. For example, the coil 110 can be composed of carbon steel in whole or in part. In another example, the coil 110 can be composed of from about 5 mm to about 10 mm thick carbon steel tubing or piping. In another example, the coil 110 can be composed of about 6 mm (about 0.25 inches) steel tubing or piping.

The housing 115 can at least partially enclose the coil 110 and can have one or more first openings 117 and one or more second openings 118. The first end 113 of the coil 110 can be disposed proximate the first opening 117 and the second end 112 of the coil 110 can be oriented toward the second opening 118. The housing 115 can include one or more sidewalls 116 and a frame 125. The housing 115 can mitigate influences on the coil 110 from the environment, e.g., subsea currents, and can create stability for heat transfer. When the heat exchanger 100 operates to cool a fluid flowing through the coil 110, the heat transfer medium can flow through the first opening 117 and out the second opening 118.

The coil 110 can be disposed within the housing 115 and spaced from the sidewall 116 and the frame 125. For example, the coil 110 can be centered within the housing 115. The space or distance between the coil 110 and the sidewall 116 can, among other factors, help induce a current of a heat transfer medium or coolant, e.g., water or seawater, within the housing 115.

The frame 125 and the sidewall 116 can provide strength and/or shape to the heat exchanger 100. For example, the frame 125 can reinforce the sidewall 116. The frame 125 can have a variety of shapes and sizes to allow inflow and outflow of the heat transfer medium into and out of the heat exchanger 100. For example, the frame 125 can be shaped as, but is not limited to, a cube, a rectangular box, a cylinder, a cone, a sphere, a dome, a pyramid, a polyhedron, a triangular prism, a hyperboloid structure, or some other shape or combination thereof. As shown, the frame 125 can have a cylindrical bottom and a dome shaped top, where poles or bars 126 can be substantially perpendicularly disposed on, attached to, or otherwise secured to the foundation 160 for added support. A cylindrical bottom and dome shaped top can be easily manufactured, structurally sound, and/or can handle stresses of expansion and/or contraction.

The top of the frame 125 can have one or more openings sized to allow tooling, e.g., cleaning tools, to reach the coil 110 and other parts of the heat exchanger 100. For example, the frame 125 can protrude from the second opening 118 of the housing 115, leaving openings between the poles 126. The openings between the poles 126 and the second opening 118 of the housing 115 can be used as maintenance ports. In another example, the poles 126 can be joined to a ring 127 to form the domed shaped top of the frame 125. The ring 127 can be aligned along a longitudinal axis, e.g., a central longitudinal axis, extending through the second opening 118 of the housing 115. Tools and/or control lines (not shown) can be introduced to the coil 110 via the ring 127. For example, a high pressure jet (not shown) can be lowered through the ring 127 and aligned therewith, to clean the inside of the housing 115 and/or the coil 110. The ring 127, in conjunction with the rest of the frame 125, can be used for alignment and stability of the heat exchanger 100 while it is moving and/or while it is stationary. For example, the frame 125 can provide support for the heat exchanger 100 if it is being moved to or removed from its operating location, e.g., the sea floor bottom proximate a wellbore or production zone. Various equipment and tools can connect to the frame 125 during movement of the heat exchanger 100 and/or during maintenance of the heat exchanger 100.

Although not shown, the top of the frame 125 can be partially or completely enclosed by a cover. The cover (not shown) can be removable or can have access ports disposed therein. The cover can be or include a screen that can allow fluid transfer and protect the heat exchanger 100 from debris and projectiles.

The sidewall 116 of the housing 115 can be disposed on the outside and/or inside of the frame 125, can be formed as part of the frame 125, or a combination thereof. In one example, the frame 125 and the sidewall 116 can be integrated with one another, i.e., one piece. The sidewall 116 can match or correspond to the shape of the frame 125 or can have a different shape. For example, if the bottom of the frame 125 is cylindrical, as shown, the sidewall 116 can have a similar cylindrical shape. Although not shown, the sidewall 116 can have a different shape than frame 125. For example, the sidewall 116 can be boxlike if the frame 125 is cylindrical.

The sidewall 116 can extend from the first opening 117 to the second opening 118. The sidewall 116 can minimize or reduce dynamic changes based on external surroundings. For example, the sidewall 116 can protect the coil 110 from damage caused by projectiles, nearby equipment, currents, and/or erosion. The sidewall 116 can be designed with vibration limiting and/or drag reducing devices including, but not limited too, fins, fairings, and strakes. Although not shown, the sidewall 116 can have doors and/or baffles to further control current flow through the coil 110. Doors (not shown) in the sidewall 116 can be used as maintenance ports for maintenance and/or installation of components of the coil 110.

The sidewall 116 can help to mitigate, control, or adjust a current or flow rate of the heat transfer medium. For example, the larger a distance 119 between the second end 112 of the coil 110 and the second opening 118, the less effect current can have on an efficiency of the heat exchanger 100. The distance 119 for a given heat exchanger 100 can be based, at least in part, on an appropriate distance that can maximize heat transfer between the heat transfer medium and the fluid in the coil 110. The distance 119 for a given heat exchanger 100 can also be based, at least in part, on the particular location or environment. For example, a heat exchanger 100 located subsea in arctic waters could have a larger distance 119 than a heat exchanger located subsea in tropical waters. The distance 122 between the sidewall 116 and the coil 110 can also be based, at least in part, on the size of the coil 110 and the desired current through the heat exchanger 100. For example, depending, at least in part, on the particular environment the heat exchanger 100 can be located, the distance 122 can be configured to minimize or otherwise reduce a flow rate restriction of a heat transfer medium, e.g., water or seawater, through the housing 115. Although not shown, in one or more embodiments, the distance 119 and/or the distance 122 can be adjustable or otherwise variable during operation of the heat exchanger 100.

The first opening 117 can be spaced between an end of the housing 115 and the foundation 160. The first opening 117 can be adjustable in size. For example, the housing 115 can include a sliding sleeve 120 that can be adjusted to control the size of the first opening 117. The opening 117 can extend or partially extend about a perimeter of the housing 115. Although not shown, the first opening 117 can be a plurality of openings. For example, the first opening 117 can be one or more perforations or holes in the sidewall 116 of housing 115, the foundation 160, or both. The perforations (not shown) can be adjustable in size or can have a fixed size. For example, the perforations can be sealed or partially sealed by removable plugs or moveable parts (not shown).

As shown, the sliding sleeve 120 can be disposed at least partially about an outer surface of the sidewall 116. It will be appreciated, however, that the sliding sleeve 120 can also be disposed at least partially within the sidewall 116, e.g., proximate an inner surface of the sidewall 116. The sliding sleeve 120 can move from a closed position, through a range of open positions, to a completely open position. For example, the sliding sleeve 120 in the closed position can have one end flush with the foundation 160, thereby at least partially sealing the first opening 117. The sliding sleeve 120 can correspond in shape to the housing 115 and/or sidewall 116 to effectively extend the housing 115 and/or sidewall 116 toward the opening 117. For example, with a cylindrical sidewall 116, the sliding sleeve 120 can be cylindrical. In another example, the sliding sleeve 120 can be rectangular if the housing 115 is rectangular. For a cylindrical sliding sleeve 120 and sidewall 116, the sliding sleeve 120 can have a larger or slightly larger circumference than the cylindrical sidewall 116. If the first opening 117 includes one or more perforations (not shown) in the sidewall 116, the sliding sleeve 120 can be in a closed position to seal the perforations and in an open position if the perforations are at least partially uncovered.

The sliding sleeve 120 can regulate the size of the first opening 117. For example, the degree to which the sliding sleeve 120 uncovers the first opening 117 can control the amount of coolant flow across the coil 110. One or more motors or actuators (two are shown 140 and 141) can control the movement of the sliding sleeve 120 from the closed position to the range of open positions. The actuators 140, 141 can be controlled electronically, pneumatically, mechanically, hydraulically, or by any combination thereof. In one example, the sliding sleeve 120 and the actuators 140, 141 can be the only moving parts of the heat exchanger 100 to limit complexity of the heat exchanger 100. In another example, the heat exchanger 100 can include other moving parts such as flow valves 135, 136 and additional actuators (not shown).

The foundation 160 can support and/or lift the coil 110 and the housing 115 from the surface, e.g., the sea floor. The foundation 160 can prevent sand and/or other debris from damaging and interfering with the functioning of the heat exchanger 100. The foundation 160 can support the housing 115. For example, the poles 126 of the housing 115 can be secured on or to the foundation 160. The foundation 160 can provide a surface on which the sliding sleeve 120 can be at least partially sealed against and can at least partially anchor actuators 140, 141 as they move the sliding sleeve 120 up and down.

The foundation 160 can be any shape that can provide a stable surface for supporting the heat exchanger 100, including, but not limited to, cylindrical, frusto-conical, or a rectangular box. The foundation 160 can vary in size as long as it is large enough to support the heat exchanger 100. The foundation 160 can be solid or be hollow, i.e., having voids. The foundation 160, for example, can be a mudmat, manifold, concrete slab, plastic or polymeric structure such as a rectangular block, rock, bricks, metal structure, or other foundation capable of supporting the heat exchanger 100. For example, the foundation 160 can just be a frame. Although not shown, the heat exchanger 100 can not include a foundation 160 and can sit directly on the sea floor.

The heat exchanger 100 can include a bypass loop 107 having a first end joined to the coil 110 proximate the inlet 105 and a second end joined to the coil 110 proximate the outlet 106. One or more bypass valves 135 can be disposed on the first end of the bypass loop 107 to allow adjustment of flow into the bypass loop 107. The bypass loop 107 and the bypass valve 135 can be disposed on the foundation 160. For example, the bypass loop 107 and bypass valve 135 can be secured to the foundation 160. The bypass loop 107 can allow a coil 110 to be selectively removed or partially removed from a flow path if not in use. For example, several heat exchangers 100 can be linked in series and/or in parallel and can be selectively turned on and off by opening or closing the bypass valve 135 to the respective bypass loops 107. The bypass valve 135 and the flow valve 136 can function independently or dependently to alter the flow path into or around the heat exchanger 100. For example, if the bypass valve 135 is opening to allow fluid to the bypass loop 107, the flow valve 136 can simultaneously be closing to restrict flow to the coil 110. In another example, the amount of fluid introduced via 105 can be reduced via the flow valve 136, the bypass valve 135, or both.

A flow meter 130 can be disposed at or near the inlet 105. Although not shown, another flow meter can be disposed at or near the outlet 106 to monitor flow through the heat exchanger 100. The flow meter 130 can measure the rate of flow coming into the heat exchanger 100 and/or the bypass loop 107.

One or more temperature sensors (two are shown 131 and 132) and one or more pressure sensors (two are shown 133 and 134) can be disposed at or proximate the coil 110. For example, a first pressure sensor 131 and a first temperature sensor 133 can be disposed at the inlet 105 to the coil 110 to measure the temperature and pressure of the fluid coming into the heat exchanger 100. A second pressure sensor 132 and a second temperature sensor 134 can be disposed at the outlet 106 to the coil 110 to measure the temperature and pressure of the fluid coming out of the heat exchanger 100.

One or more control lines 150 can connect to the flow meter 130, the temperature sensors 131, 133, the pressure sensors 132, 134, the bypass valve 135, the flow valve 136, and the sliding sleeve actuators 140, 141. The one or more control lines 150 can control the operation of the actuators 140, 141 and thereby the movement of the sliding sleeve 120. The one or more control lines 150 can receive signals from and/or send signals to a remote location (e.g., a wellbore), a controller, a boosting station, a production manifold, the surface (e.g., a surface vessel or rig), or any combination thereof. For example, the pressure sensors 132, 134, the temperature sensors 131, 133, and/or the flow meter 130 can communicate with other parts of a hydrocarbon cooling system, e.g., a pump, a control unit, and/or can communicate with the surface.

Although not shown, a manifold can cover, contain, or otherwise at least partially enclose the foundation 160, the bypass line 107, the valves 135, 136, the flow meter 130, and the sensors 131, 132, 133. The manifold can also enclose one or more pumps that can function in conjunction with the heat exchanger 100. The manifold can protect the components therein from environmental factors, e.g., debris, currents, and/or erosion.

In operation, the heat exchanger 100 can be partially or completely submersed in the heat transfer medium. Depending, at least in part, on the particular environment the heat exchanger 100 can be located or otherwise disposed, the particular heat transfer medium can vary. Illustrative heat transfer mediums can include, but are not limited too, water, seawater, air, compressed air, mercury, hydrocarbon based fluids such as oil, or any combination thereof. For example, the heat exchanger 100 can be disposed subsea, e.g., at a sea floor bottom at or proximate a deep sea drilling wellhead or production zone. As used herein, the terms "sea" and "subsea" are used interchangeably and can refer to any body of water or waterway, including, but not limited to, oceans, bays, lakes, ponds, bayous, creeks, rivers, estuaries, harbors, reservoirs, brooks, lagoons, straights, streams, or any combination thereof. In another example, the heat exchanger 100 can be used on the surface with air as the heat transfer medium. The heat exchanger 100 can be in fluid communication with a wellhead or a plurality of wellheads via a manifold (not shown).

While at least partially submersed in the heat transfer medium, the coil 110 of the heat exchanger 100 can receive a fluid, e.g., a hydrocarbon fluid, at the inlet 105 to produce a fluid, e.g., a cooled hydrocarbon fluid, at the outlet 106. Fluid from the inlet 105 can travel through the inlet conduit 111 to the second end 112 of the coil 110 and then through the conduits 114 to the first end 113 of the coil 110. Heat can be transferred from the fluid to the heat transfer medium through the walls of the conduits 114. Heat transfer medium that has increased in temperature can rise as a result and can induce a current within the housing 115. The heat transfer can be by conduction and/or convection.

The sidewalls 116 of the housing 115 can contain the heat transfer medium that has increased in temperature and can guide or direct the heat transfer medium toward the second opening 118 of the housing 115. To increase current flow within the housing 115, the sliding sleeve 120 can be actuated from the closed position to one of its open positions to allow more heat transfer medium in through the first opening 117 of the housing 115. For example, the flow through the housing 115 can be at a maximum flow if the sliding sleeve 120 is in its completely open position.

The flow meter 130, the temperature sensors 131, 132, and the pressure sensors 133, 134 can measure the flow, temperature, and pressure, respectively of the fluid in going in and out of the heat exchanger 100. The information measured can be conveyed through the control line 150 or wirelessly to a control unit, the surface, or a combination thereof. The actuators 140, 141 for the sliding sleeve 120 can be activated through the control line 150 or wirelessly, based, at least in part, on the measured flow, temperature, pressure.

The actuators 140, 141 can be instructed to open the sliding sleeve 120 further to allow more of the heat transfer medium to contact the coil 110 if more heat transfer is desired from the heat exchanger 100. Similarly, the actuators 140, 141 can be instructed to at least partially close the sliding sleeve 120 to minimize or reduce the amount the heat transfer medium contacting the coils 110. The bypass valve 135 can be activated to force or allow the fluid through the bypass loop 107 if the heat exchanger 100 is not required.

Figure 2:
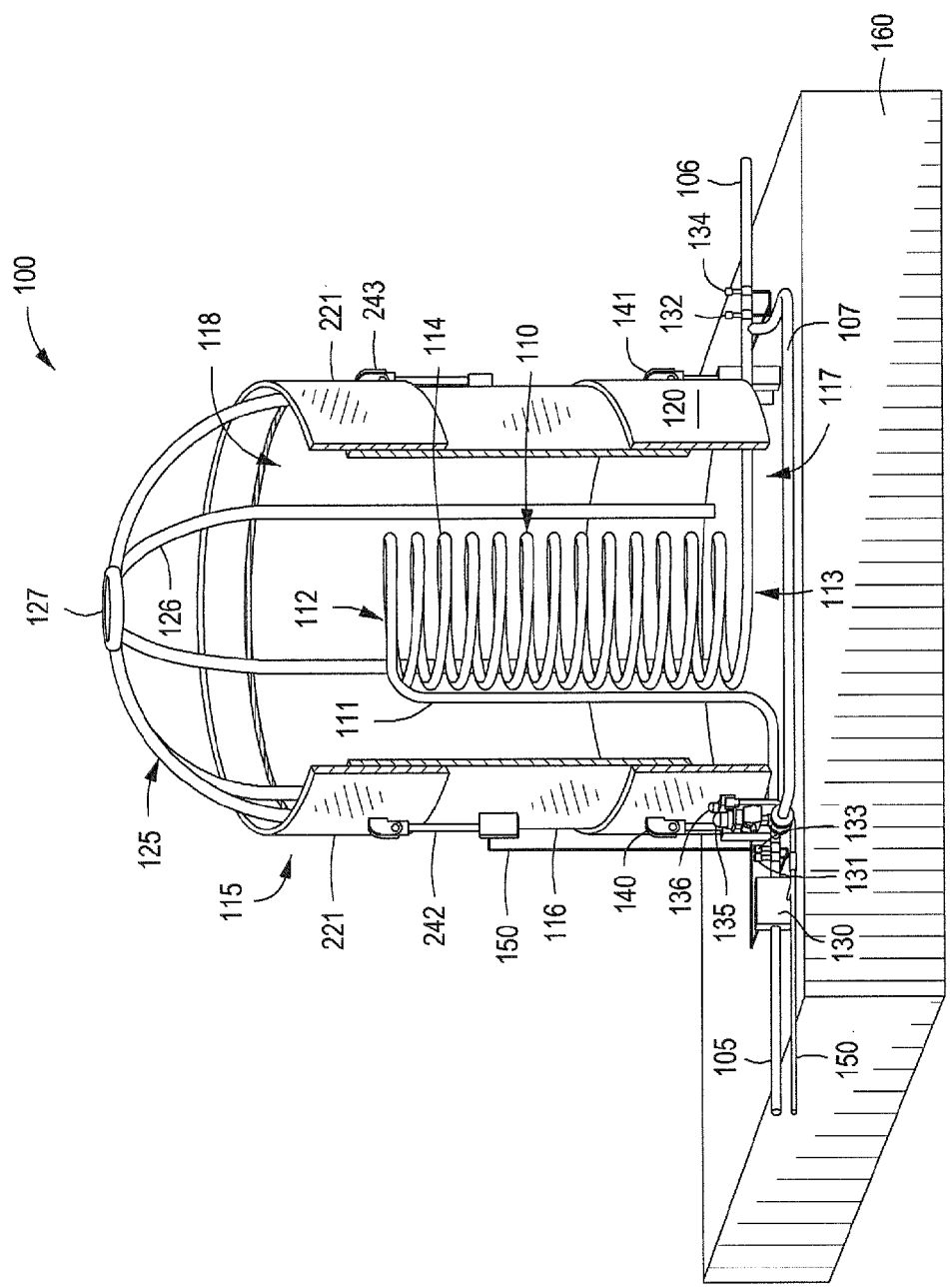
FIG. 2 depicts a perspective sectional view of an illustrative heat exchanger having a second sliding sleeve, according to one or more embodiments described.

FIG. 2 depicts a perspective sectional view of an illustrative heat exchanger 200 having a second sliding sleeve 221, according to one or more embodiments. The heat exchanger 200 can be similar to the heat exchanger 100, but can also have a second or "upper" sliding sleeve 221 disposed proximate the second opening 118 of the housing 115.

One or more actuators (two are shown 242, 243) can raise and lower the sliding sleeve 221. The actuators 242, 243 can receive instructions via the control line 150 or via wireless transmission. Although not shown, the actuators 242, 243 can send and receive information and/or instructions to and/or from a remote location (e.g., a wellbore), a controller, a boosting station, a production manifold, the surface (e.g., a surface vessel or rig), or any combination thereof.

The second sliding sleeve 221 can be adapted to change the distance from the second opening 118 to the coil 110. For example, the sliding sleeve 221 can be raised or lowered to increase or decrease the distance between the second opening 118 and the second end 112 of the coil 110. As discussed and described above, the distance between the second opening 118 and the second end 112 of the coil 110 can be designed to minimize drafting and/or current interference with the heat exchange process occurring within the housing 115. The second sliding sleeve 221 can allow the distance between the second opening 118 and the second end 112 of the coil 110 to be adjusted for changed or changing environmental conditions, changed or changing fluid temperature coming into the coil 110, or any combination thereof. For example, if the heat exchanger 200 is moved to a new location, environmental and system conditions may differ from a previous location. The second sliding sleeve 221 can be adjusted for those new conditions without redesign, refitting, added components, or added expense.

Figure 3:
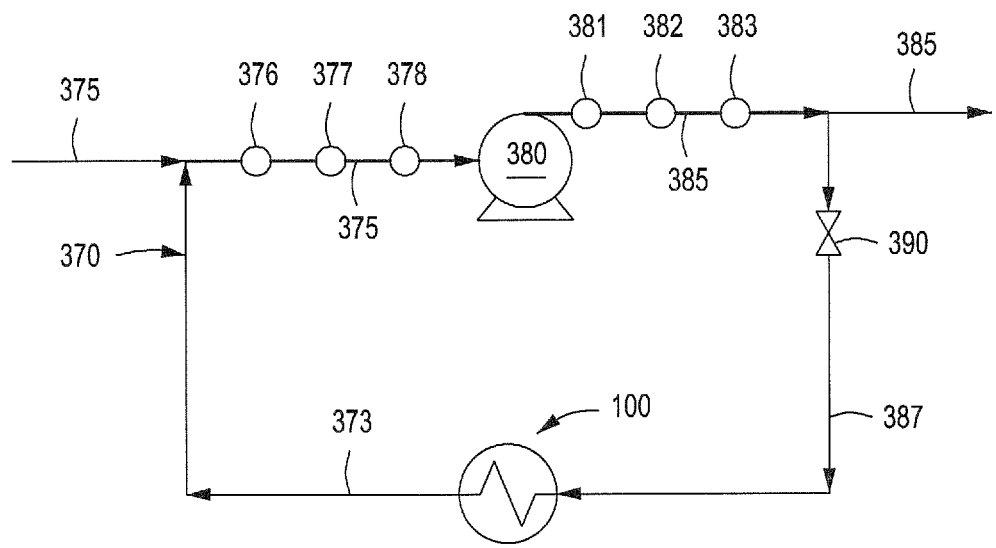
FIG. 3 depicts a schematic of an illustrative system for controlling the temperature of a fluid during transport having the heat exchanger depicted in FIG. 1, according to one or more embodiments described.

FIG. 3 depicts a schematic of an illustrative system 300 for controlling a temperature of a fluid during transport having the heat exchanger 100 depicted in FIG. 1, according to one or more embodiments. The system 300 can include one or more flow lines (two are shown 370, 385), one or more pumps 380, and one or more recirculation loops 370.

A fluid, e.g., a hydrocarbon, can be introduced via a first flow line 375 to the pump 380 to produce a pumped or boosted fluid via a second flow line 385. The pumped fluid via the second flow line 385 can be transported to an alternate location, including, but not limited to, a production manifold, a boosting station, the surface (e.g., a surface vessel or rig), or any combination thereof.

One or more first temperature sensors 376, one or more first pressure sensors 377, and/or one or more first flow meters 378 can be disposed on the first flow line 375 to measure the temperature, pressure, and flow rate, respectively, of the fluid in the first flow line 375. One or more second temperature sensors 381, one or more second pressure sensors 382, and one or more second flow meters 383 can be disposed on the second flow line 385 to measure the temperature, pressure, and flow rate, respectively, of the pumped fluid in the second flow line 385. Although not shown, the sensors 376, 377, 381, 382, the flow meters 378, 383, and a control valve 390 can be joined to one or more control lines. The sensors 376, 377, 381, 382 and flow meters 378, 383 can send and receive signals via the control lines or via wireless transmission to and from other parts of the hydrocarbon processing operation (not shown) including, but not limited to, one or more pumps, one or more control units, the surface (e.g., a surface ship or rig), or any combination thereof. Although not shown, the sensors 376, 377, 381, 382, the flow meters 378, 383, the control valve 390, and/or the pump 380 can be disposed in a manifold.

The fluid via the first flow line 375 can have a first temperature ranging from a low about 3° C., about 5° C., about 10° C., about 20° C., about 30° C., or about 40° C. to a high of about 150° C., about, 175° C., about 200° C., about 225° C., about 250° C., or about 275° C. For example, the first temperature of the fluid via the first flow line 375 can be about 15° C. to about 265° C., about 25° C. to about 230° C., or about 35° C. to about 180° C. In another example, the first temperature of the fluid via the first flow line 375 can be about 82° C. (about 180° F.) or less.

The fluid via the first flow line 375 can have a first pressure ranging from a low about 101 kilopascals ("kPa"), about 300 kPa, about 680 kPa, about 1,800 kPa, about 3,000 kPa, about 4,000 kPa, or about 5,000 kPa to a high of about 20,000 kPa, about 35,000 kPa, about 70,000 kPa, or about 140,000 kPa. For example, the first pressure in the first flow line 375 can range from about 25 kPa to about 125,000 kPa, about 150 kPa to about 50,000 kPa, about 3,500 kPa to about 30,000 kPa. The pump 380 can increase the pressure of the fluid introduced from the first flow line 375 to maintain a flow of the fluid in the second flow line 385.

The recirculation loop 370 can have one or more heat exchangers 100 disposed therein. The recirculation loop 370 can be formed by two or more lines or conduits (two are shown 387 and 373). Fluid from the second flow line 385 can be introduced to the heat exchanger 100 via a first line 387 to produce a cooled fluid via a second line 373 that can be reintroduced to the first flow line 375. The one or more control or choke valves 390 can be disposed in the first line 387 to regulate the amount of fluid and/or pressure of the fluid flowing through the recirculation loop 370.

The recirculation loop 370 can be activated by at least partially opening one or more control valves 390 to increase and/or regulate flow through pump 380 and/or to maintain the temperature of the fluid in the second flow line 385 below a maximum design temperature of the system 300 or a desired temperature threshold. For example, when one or both of the flow meters 378, 383 determine a decrease in the flow rate through the pump 380, the control valve 390 can be opened to activate the recirculation loop 370. Once the control valve 390 is open, all or a portion of the fluid via line 385 can be diverted to the recirculation loop 370.

The heat exchanger 100 in the recirculation loop 370 can cool the fluid flowing through the recirculation loop 370. For example, if the temperature of the pumped fluid in the second flow line 385, as determined by the second temperature sensor 381, reaches a second temperature that approaches the maximum design temperature or the desired temperature threshold, the control valve 390 can be opened to allow fluid to flow through the heat exchanger 100 in the recirculation loop 370. In another example, if the temperature of the pumped fluid in the second flow line 385 reaches the second temperature, the sliding sleeve 120 of the heat exchanger 100 can be opened to allow more cooling element into the housing 115 of the heat exchanger 100, without adjusting the amount of flow through the recirculation loop 370. The maximum design temperature can be variable based on project and material design requirements. For example, the maximum design temperature can range from a low of about 3° C., about 10° C., about 50° C., or about 100° C. to a high of about 150° C., about 200° C., about 250° C., or about 300° C. In another example, the maximum design temperature can be about 175° C. or less.

The temperature sensors 131, 132 in the heat exchanger 100 can measure the temperature of the fluid going in and out of the heat exchanger 100. The heat exchanger 100 can cool the diverted fluid to a temperature equal to the first temperature of the fluid in the first flow line 375. For example, if the second temperature measured by the second temperature sensor 132 in the second flow line 385 is greater than the first temperature measured by the first temperature sensor 131 in the first flow line 375, the sliding sleeve 120 of the heat exchanger 100 can be adjusted to allow heat transfer medium into the housing 115 of the heat exchanger 100, thereby cooling the fluid in the recirculation loop 370 to the first temperature measured in the first flow line 375, a temperature below the first temperature, or a temperature between the first temperature and the second temperature measured in the second flow line 385. The sliding sleeve 120 can be automatically adjusted for changes in temperature and pressure in the flow lines 375 and 385. For example, as the temperature sensor 381 measures a temperature increase in the flow line 385, the sliding sleeve 120 of the heat exchanger 100 can be actuated to allow more of the heat transfer medium into the housing 115 and in contact with the coil 110. This can result in increase heat transfer by conduction, convection, or both. In this way, the first flow rate through the pump 380 can be maintained without a dramatic temperature increase in the system 300.

The recirculation loop 370 can provide additional flow to the first flow line 375 to maintain a minimum flow rate in the pump 380. This can allow the pump 380 to remain in operation if the flow rate in the first flow line 375 drops below the minimum flow rate of the pump 380. Thus, the pump 380 can operate over a large range of flow rates and can lower the acceptable minimum flow rate from a fluid source, e.g., a hydrocarbon field or well, thereby increasing the operation efficiency of the pump 380. For example, with the recirculation loop 370 available, the pump 380 can operate at flow rates of about 80% or even 90% of the maximum flow rate of the pump 380. Increasing the operation range of the pump 380 can lower capital cost and increase the efficiency of the system 300. Increasing the flow rate to the pump 380 can increase the efficiency of the pump 380 by allowing pump operation at ideal conditions, i.e., away from modes of operation that produce excessive mechanical stress on components of the pump 380. Maintenance and system downtime of the system 300 can be reduced if the pump 380 runs at maximum efficiency.

Although not shown, a plurality of pumps 380 each having one or more lines 370 can be run in series, in parallel, or a combination thereof to transport hydrocarbons from a source, e.g., a subsea well or production zone, to a further location, e.g., a surface ship or rig.

Figure 4:
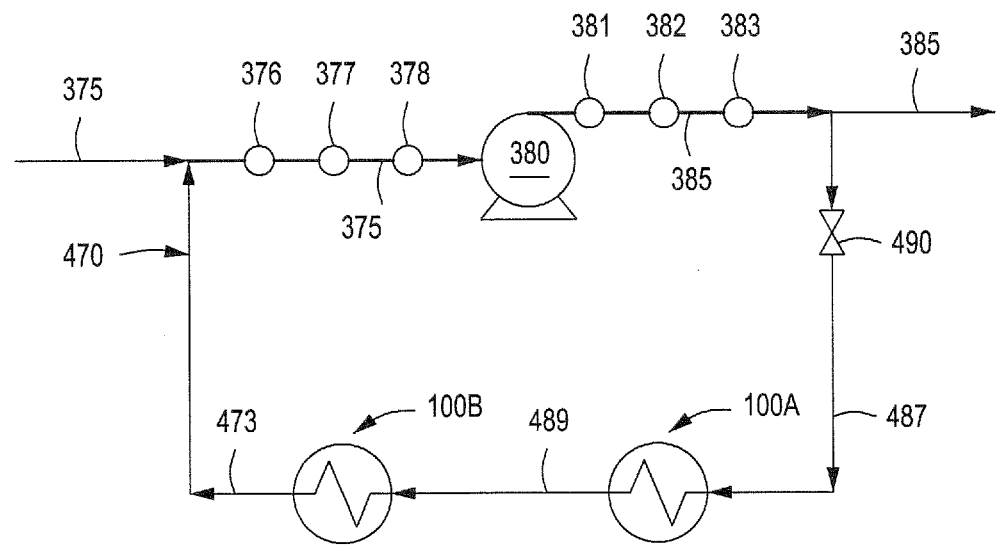
FIG. 4 depicts a schematic of another illustrative system for controlling the temperature of a fluid during transport having two of the heat exchangers depicted in FIG. 1 arranged in series with respect to one another, according to one or more embodiments described.

FIG. 4 depicts schematic of another illustrative system 400 for controlling the temperature of a fluid during transport having two of the heat exchangers 100 depicted in FIG. 1 arranged in series with respect to one another, according to one or more embodiments. Similar to the system 300 in FIG. 3, the system 400 depicted in FIG. 4 can include one or more flow lines (two are shown 370, 385), one or more pumps 380, and one or more recirculation loops 470.

The recirculation loop 470 can include two or more heat exchangers (two are shown 100A, 100B) linked in series and one or more control or choke valves 490. Although two heat exchangers 100A and 100B are shown in series, more heat exchangers can be added in series, in parallel, or both. The recirculation loop 470 can be formed by a plurality of lines or conduits (three are shown 487, 489, 473). Fluid from the second flow line 385 can be introduced via a first line 487 to a first heat exchanger 100A to produce a first cooled fluid via a second line 489. The first cooled fluid can be introduced via the second line 489 to a second heat exchanger 100B to produce a second cooled fluid via a third line 473. The second cooled fluid via the third line 473 can be reintroduced to the first flow line 375. The control valve 490 can be disposed in the first line 487 to regulate the amount of fluid flowing through the recirculation loop 470.

One or more first temperature sensors 376, one or more first pressure sensors 377, and one or more first flow meters 378 can be disposed on the first flow line 375 to measure the temperature, pressure, and flow rate of the fluid in the first flow line 375. One or more second temperature sensors 381, one or more second pressure sensors 382, and one or more second flow meters 383 can be disposed on the second flow line 385 to measure the temperature, pressure, and flow rate of the pumped fluid in the second flow line 385.

In operation, a fluid, e.g., a hydrocarbon fluid, can be introduced via the first flow line 375 to the pump 380 to produce a pumped fluid via a second flow line 385. The pumped fluid via the second flow line 385 can be transported to an alternate location, including, but not limited to, a production manifold, a boosting station, or the surface (e.g., a surface vessel or rig). The pump 380 can increase the pressure of the fluid introduced from the first flow line 375 to maintain the first flow rate of the fluid or increase the flow rate of the fluid to a second flow rate in the second flow line 385.

The recirculation loop 470 can be activated by at least partially opening the control valve 490 to increase flow through pump 380 and/or to maintain the temperature of the fluid in the second flow line 385 below a maximum design temperature of the system 400 or a desired temperature threshold. For example, when one or both of the flow meters 378, 383 determine a decrease in the flow rate through the pump, the control valve 490 can be opened to activate the recirculation loop 470. All or a portion of the fluid via line 385 can be diverted to the recirculation loop 470.

The heat exchangers 100A, 100B can cooperate to cool the fluid and thereby lower the pressure of the fluid flowing through the recirculation loop 470. For example, if the temperature of the pumped fluid in the second flow line 385, as determined by the second temperature sensor 381, reaches a second temperature that approaches the maximum design temperature or the desired temperature threshold, the control valve 490 can be at least partially opened to allow fluid to flow through the first heat exchanger 100A and then through the second heat exchanger 100B in the recirculation loop 470. In another example, if the temperature of the pumped fluid in the second flow line 385 reaches the second temperature, the sliding sleeves 120 of one or both of the heat exchangers 100A, 100B can be opened to allow more cooling element into the housings 115 of the heat exchangers 100A, 100B, without adjusting the amount of flow through the recirculation loop 470. The maximum design temperature can range from a low of about 3° C., about 10° C., about 50° C., or about 100° C. to a high of about 150° C., about 200° C., about 250° C., or about 300° C. In another example, the maximum design temperature can be about 175° C. or less.

Placing the heat exchangers 100A, 100B in series can effectively increase the surface area of the coils 110. For example, in some circumstances the two or more heat exchangers 100A, 100B in series can be used instead of a larger heat exchanger 100 having a larger coil 110. Several smaller heat exchangers 100 can lower material and/or transport costs. For example, large heat exchangers 100 can require large transport vessels and equipment to place them at the sea floor and/or wellhead, whereas two smaller heat exchangers 100 can be transported with a smaller vessel. Several heat exchangers 100 can also improve the robustness of the system 400. For example, if one of the heat exchangers 100 should fail or require maintenance, the system 400 can continue via the bypass line(s) 107 of the inoperative heat exchanger 100.

The temperature sensors 131, 132 in the heat exchangers 100A, 100B can measure the temperature of the fluid going in and out of each heat exchanger 100A, 100B. The heat exchangers 100A, 100B can cool the diverted fluid to a temperature equal to the first temperature of the fluid in the first flow line 375, a third temperature below the first temperature measured in the first flow line 375, or a fourth temperature between the first temperature measure in the first flow line 375 and the second temperature in the second flow line 385. For example, if the second temperature measured by the second temperature sensor 132 in the second flow line 385 is greater than the first temperature measured by the first temperature sensor 131 in the first flow line 375, the sliding sleeves 120 of the heat exchangers 100A, 100B can be independently adjusted to allow heat transfer medium into the housing 115 of the heat exchangers 100A, 100B, thereby cooling the fluid to the first temperature measured in the flow line 375. The sliding sleeves 120 of the heat exchangers 100A, 100B can be automatically adjusted for changes in temperature and pressure in the flow lines 375 and 385. For example, as the temperature sensor 381 measures a temperature increase in the flow line 385, the sliding sleeve 120 of one or more of the heat exchangers 100A, 100B can be actuated to allow more of the heat transfer medium into the housing 115 and in contact with the coil 110 of each heat exchanger 100A, 100B. This can result in increased heat transfer by conduction, convection, or both. In this way, the first flow rate through the pump 380 can be maintained without a dramatic temperature increase in the system 400.

Like the recirculation loop 370 in the system 300, the recirculation loop 470 can provide additional flow to the first flow line 375 to maintain a minimum flow rate in the pump 380 for the reasons and advantages discussed and described above.

Figure 5:
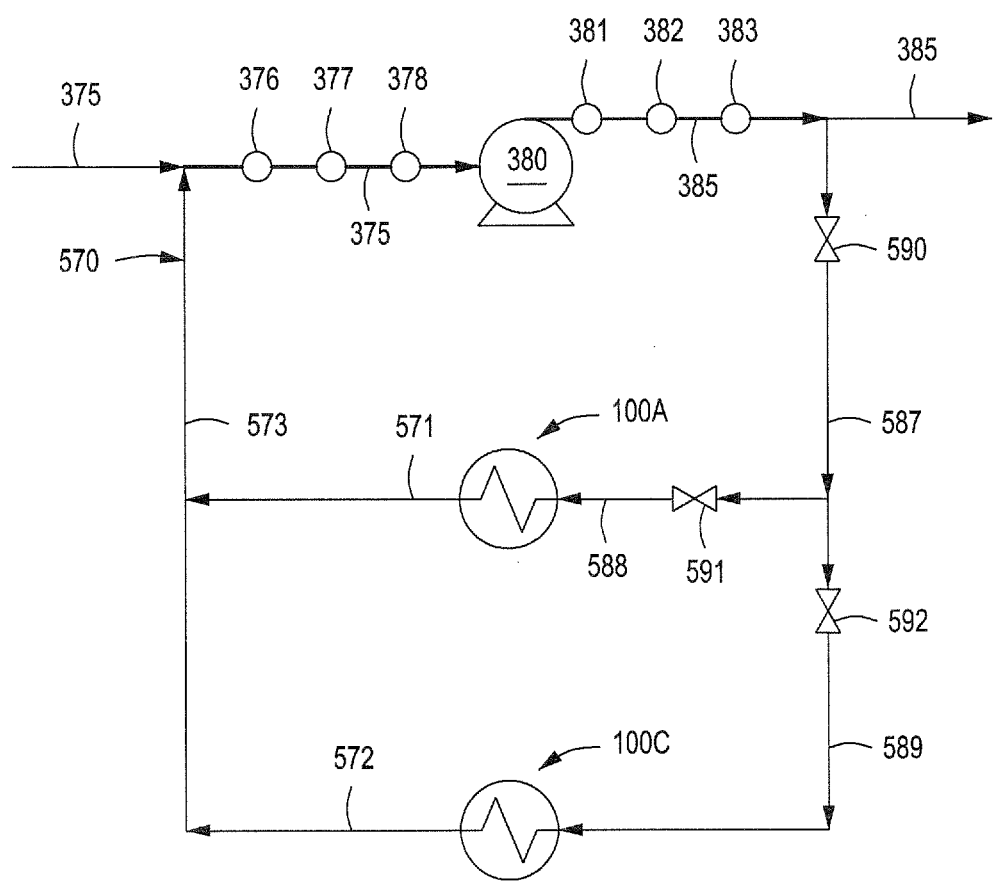
FIG. 5 depicts a schematic of yet another illustrative system for controlling the temperature of a fluid during transport having two of the heat exchangers depicted in FIG. 1 arranged in parallel with respect to one another, according to one or more embodiments described.

FIG. 5 depicts a schematic of yet another illustrative system 500 for controlling the temperature of a fluid during transport having two of the heat exchangers 100 depicted in FIG. 1 arranged in parallel with respect to one another, according to one or more embodiments. Similar to the systems 300 and 400, the system 500 can include one or more flow lines (two are shown 370, 385), one or more pumps 380, and one or more recirculation loops 570.

The recirculation loop 570 can include two or more heat exchangers (two are shown 100A, 100C) linked in parallel and one or more control or choke valves (three are shown 590, 591, 592). Although two heat exchangers 100A and 100C are shown in parallel, more heat exchangers can be added in series, in parallel, or both. The recirculation loop 570 can be formed by a plurality of lines or conduits (six are shown 587, 588, 589, 571, 572, 573) linking the heat exchangers 100A, 100C, the valves 590, 591, 592, and the flow lines 375, 385. Fluid from the second flow line 385 can be introduced via a first line 587 and a second line 588 to the first heat exchanger 100A to produce a first cooled fluid via a third line 571. Fluid from the second flow line 385 can be introduced via the first line 587 and a fourth line 589 to a second heat exchanger 100C to produce a second cooled fluid via a fifth line 572. The third and fifth lines 571 and 572 can feed into a sixth line 573, and the first cooled fluid, the second cooled fluid, or a mixture of both can be reintroduced via the sixth line 573 to the first flow line 375.

A first control valve 590 can be disposed in the first line 587 to regulate the amount of fluid flowing through the recirculation loop 570. A second control valve 591 can be disposed in the second line 588 and can regulate the amount of fluid flowing to and/or cooled by the first heat exchanger 100A. A third control valve 592 can be disposed in the second line 588 and can regulate the amount of fluid flowing to and/or cooled by the second heat exchanger 100C.

Although not shown, control lines can link control valves 590, 591, 592 to a control unit (not shown). The control unit can be disposed on the surface (e.g., a ship or a rig), proximate the pump 380 and the recirculation loop 570, at another location, or at a combination thereof. In another example, the control valves 590, 591, 592 can be wirelessly linked to the control unit.

As discussed and described above, the first temperature sensor 376, the first pressure sensor 377, and the first flow meter 378 can be disposed on the first flow line 375 to measure the temperature, pressure, and flow rate of the fluid in the first flow line 375. The second temperature sensor 381, the second pressure sensor 382, and the second flow meter 383 can be disposed on the second flow line 385 to measure the temperature, pressure, and flow rate of the pumped fluid in the second flow line 385.

In operation, a fluid, e.g., a hydrocarbon fluid, can be introduced via the first flow line 375 to the pump 380 to produce the pumped fluid via the second flow line 385. The pumped fluid via the second flow line 385 can be transported to an alternate location, including, but not limited to, a production manifold, a boosting station, or the surface (e.g., a surface vessel or rig). As in the systems 300 and 400, the pump 380 can increase the pressure of the fluid introduced from the first flow line 375 to maintain the first flow rate of the fluid or increase the flow rate of the fluid to a second flow rate in the second flow line 385. The first temperature, first pressure, and first flow rate in the first flow line 375 and the second flow rate in the second flow line 385 can be the same or similar to those discussed and described above.

The recirculation loop 570 can be activated by at least partially opening the control valve 590 and one or more of the second and third control valves 591, 592 to increase flow through pump 380 and/or to maintain the temperature of the fluid in the second flow line 385 below a maximum design temperature of the system 500. For example, the third control valve 592 can be closed to completely block the flow of fluid to the fourth line 589 and the second heat exchanger 100C, thereby allowing fluid to only be cooled by the first heat exchanger 100A. In another example, the second control valve 591 can be closed to completely block the flow of fluid to the second line 588 and the first heat exchanger 100A, thereby allowing fluid to only be cooled by the second heat exchanger 100C. In yet another example, the second control valve 591 and the third control valve 592 can both be opened to allow fluid through both heat exchangers 100A and 100C. All or a portion of the fluid via line 385 can be diverted to the recirculation loop 570.

The heat exchangers 100A, 100C can work independently or cooperate to cool the fluid and thereby lower the pressure of the fluid flowing through the recirculation loop 570. For example, as the temperature of the pumped fluid in the second flow line 385, as determined by the second temperature sensor 381, reaches a second temperature that approaches the maximum design temperature or a desired temperature threshold, the first control valve 590 and the second control valve 591 can be at least partially opened to allow fluid to flow through the first heat exchanger 100A. If further cooling is desired, the third control valve 592 can be at least partially opened to allow fluid to flow through the second heat exchanger 100C. In another example, if the temperature of the pumped fluid in the second flow line 385 reaches the second temperature, the sliding sleeves 120 of one or both of the heat exchangers 100A, 100C can be opened to allow more cooling element into the housings 115 of the heat exchangers 100A, 100C, without adjusting the amount of flow through the recirculation loop 570. The maximum design temperature can range from a low of about 3° C., about 10° C., about 50° C., or about 100° C. to a high of about 150° C., about 200° C., about 250° C., or about 300° C. For example, the maximum design temperature can be about 175° C. or less.

Placing the heat exchangers 100A, 100C in parallel can effectively increase the surface area of the coils 110. For example, the two or more heat exchangers 100A, 100C in parallel can be used instead of a larger heat exchanger 100 having a larger coil 110. Placing the heat exchangers 100A, 100C in parallel with the control valves 590, 591, 592 can allow flexible adjustment of the effective surface area of the coil 110 by activating one or more of the heat exchangers 100A, 100C.

The temperature sensors 131, 132 in the heat exchangers 100A, 100C can measure the temperature of the fluid going in and out of each heat exchanger 100A, 100C. The heat exchangers 100A, 100C can cool the diverted fluid to a temperature equal to the first temperature of the fluid in the first flow line 375. For example, if the second temperature measured by the second temperature sensor 132 in the second flow line 385 is greater than the first temperature measured by the first temperature sensor 131 in the first flow line 375, the sliding sleeves 120 of the heat exchangers 100A, 100C can be adjusted to allow heat transfer medium into the housing 115 of the heat exchangers 100A, 100C, thereby cooling the fluid via the sixth line 573 to the first temperature in the flow line 375. The sliding sleeves 120 of the heat exchangers 100A, 100C can be automatically adjusted for changes in temperature and pressure in the flow lines 375 and 385. For example, if the temperature sensor 381 measures a temperature increase in the flow line 385, the sliding sleeve 120 of one or more of the heat exchangers 100A, 100C can be actuated to allow more of the heat transfer medium into the housing 115 and in contact with the coil 110 of each heat exchanger 100A, 100C. This can result in increased heat transfer by conduction, convection, or both. In this way, the first flow rate through the pump 380 can be maintained without a dramatic temperature increase in the system 500.

The recirculation loop 570 can provide additional flow to the first flow line 375 to maintain a minimum flow rate in the pump 380 for the reasons and advantages discussed and described above.

Embodiments of the present disclosure further relate to any one or more of the following paragraphs:

1. A method for transporting a hydrocarbon, comprising introducing a fluid at a first pressure and a first temperature to an inlet of a pump; pressurizing the fluid within the pump to produce a pressurized fluid having a second pressure and a second temperature; and flowing at least a portion of the pressurized fluid through a first heat exchanger and back to the inlet of the pump, wherein the heat exchanger comprises: a coil having an inlet and an outlet; a housing at least partially enclosing the coil and having a first opening and a second opening, wherein a first end of the coil is disposed proximate the first opening; and a foundation for supporting the coil and the housing.

2. The method of paragraph 1, wherein flowing the at least a portion of the pressurized fluid through the first heat exchanger cools the at least a portion of the pressurized fluid.

3. The method of paragraph 2, wherein the at least a portion of the pressurized fluid flows through one or more valves to produce a depressurized fluid prior to flowing the at least a portion of the pressurized fluid through the first heat exchanger.

4. The method according to any one of paragraphs 1 to 3, further comprising flowing the at least a portion of the pressurized fluid through the first heat exchanger, a second heat exchanger, and back to the inlet of the pump.

5. The method of paragraph 4, wherein the second heat exchanger is arranged in series with the first heat exchanger.

6. The method of paragraph 4 or 5, wherein the second heat exchanger is arranged in parallel with the first heat exchanger.

7. The method according to any one of paragraphs 1 to 6, further comprising sensing at least one of a pressure, a temperature, and a flow rate of the pressurized fluid; and adjusting an amount of the pressurized fluid flowing through the first heat exchanger based on at least one of the sensed pressure, temperature, and flow rate.

8. A system for transporting a hydrocarbon, comprising a pump having an inlet and an outlet; a recirculation loop joined to the outlet of the pump at a first end of the recirculation loop and joined to the inlet of the pump at a second end of the recirculation loop, the recirculation loop comprising: a heat exchanger; and a control valve disposed between the first end of the loop and the heat exchanger.

9. The system of paragraph 8, wherein the heat exchanger comprises: a coil having a fluid inlet and a fluid outlet; a housing at least partially enclosing the coil and having a first and a second opening, wherein a first end of the coil is disposed proximate the first opening; and a foundation for supporting the coil and the housing.

10. The system of paragraph 8 to 9, further comprising one or more first temperature sensors, one or more first pressure sensors, one or more first flow meters, or any combination therefore, wherein the one or more first temperature sensors, one or more first pressure sensors, and one or more first flow meters are each disposed proximate the inlet of the pump.

11. The system of claim 10, further comprising one or more second temperature sensors, one or more second pressure sensors, one or more second flow meters, or any combination thereof, wherein the one or more second temperature sensors, one or more second pressure sensors, and one or more second flow meters are each disposed proximate the outlet of the pump.

12. An apparatus for exchanging heat between a fluid and a heat transfer medium, comprising: a coil having an inlet and an outlet; a housing at least partially enclosing the coil and having a first opening and a second opening, wherein a first end of the coil is disposed proximate the first opening; and a foundation for supporting the coil and the housing.

13. The apparatus of paragraph 12, wherein the housing comprises a sliding sleeve adapted to adjust a size of the first opening.

14. The apparatus of paragraph 13, further comprising a second sliding sleeve disposed proximate the second opening and adapted to adjust a distance between a second end of the coil and the second opening.

15. The apparatus according to any one of paragraphs 12 to 14, wherein the housing comprises a frame and a sidewall.

16. The apparatus of paragraph 15, wherein the frame protrudes from the second opening of the housing and has a ring aligned along a longitudinal axis extending through the second opening.

17. The apparatus of paragraph 15 or 16, wherein the sidewall has one or more maintenance ports.

18. The apparatus according to any one of paragraphs 12 to 17, further comprising a flow meter disposed at the hydrocarbon inlet.

19. The apparatus according to any one of paragraphs 12 to 18, wherein the coil is at least partially coated with one or more anti-fouling agents.

20. The apparatus according to any one of paragraphs 12 to 19, wherein the coil is at least partially coated with one or more anti-fouling agents.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure may be devised without departing from the basic scope thereof, and the scope thereof is determined by the claims that follow.

What is claimed is:

1. A method for transporting a hydrocarbon, comprising: positioning a pump and a first heat exchanger at a subsea location; at least partially submerging the first heat exchanger in a heat transfer medium; producing the hydrocarbon from a well, wherein the produced hydrocarbon is the fluid introduced into the pump; introducing the fluid at a first pressure and a first temperature to an inlet of the pump; pressurizing the fluid within the pump to produce a pressurized fluid having a second pressure and a second temperature; and flowing at least a portion of the pressurized fluid through the first heat exchanger and back to the inlet of the pump, wherein flowing the at least a portion of the pressurized fluid through the first heat exchanger cools the at least a portion of the pressurized fluid, and wherein the first heat exchanger comprises: a coil having an inlet and an outlet; a housing at least partially enclosing the coil and having a first opening and a second opening, wherein a first end of the coil is disposed proximate the first opening; and a foundation for supporting the coil and the housing; wherein only a portion of the pressurized fluid flowing from the pump is cooled by the first heat exchanger, wherein the heat transfer medium is selected from one of: (i) water, and (ii) seawater; controlling a flow of a convection current flowing between the first opening and the second opening of the housing by disposing at least one sleeve proximate the first opening, the at least one sleeve being moveable between a first position and a second position to at least partially close the first opening, and actuating at least one actuator connected to the at least one sleeve to move the at least one sleeve between the first position to the second position.

2. The method of claim 1, wherein the at least a portion of the pressurized fluid flows through one or more valves to produce a depressurized fluid prior to flowing the at least a portion of the pressurized fluid through the first heat exchanger.

3. The method of claim 1, further comprising flowing the at least a portion of the pressurized fluid through the first heat exchanger, a second heat exchanger, and back to the inlet of the pump.

4. The method of claim 3, wherein the second heat exchanger is arranged in series with the first heat exchanger.

5. The method of claim 3, wherein the second heat exchanger is arranged in parallel with the first heat exchanger.

6. The method of claim 1, further comprising:
sensing at least one of a pressure, a temperature, and a flow rate of the pressurized fluid; and
adjusting an amount of the pressurized fluid flowing through the first heat exchanger based on at least one of the sensed pressure, temperature, and flow rate.

7. The method of claim 1, further comprising: sensing a flow condition at the pump using at least one sensor; sending information relating to the flow condition to a controller; and controlling the at least one actuator by using the controller.

8. The method of claim 7, wherein the at least one sensor is an inlet sensor proximate the inlet of the pump, the one inlet sensor being selected from one of: a temperature sensor, a pressure sensor, and a flow meter.

9. The method of claim 7, wherein the at least one sensor is an outlet sensor proximate the outlet of the pump, the outlet sensor being selected from one of: a temperature sensor, a pressure sensor, and a flow meter.

* * * * *